United States Patent [19]
Odell et al.

[11] Patent Number: 5,823,473
[45] Date of Patent: Oct. 20, 1998

[54] LATCH-LOCK MECHANISM FOR LOAD CARRYING AIRPLANE CARGO DOORS

[75] Inventors: Richard B. Odell; Stephen J. Fox, both of Kirkland; Huw J. Salmon, Renton; John A. Ennes, Redmond, all of Wash.

[73] Assignee: The Boeing Company, Seattle, Wash.

[21] Appl. No.: 441,280

[22] Filed: May 15, 1995

[51] Int. Cl.$^6$ ........................................ B64C 1/14
[52] U.S. Cl. .................. 244/129.5; 49/280; 292/216; 292/DIG. 31
[58] Field of Search .............. 244/118.1, 129.5, 244/118.3, 129.4, 137 R; 292/216, 304, DIG. 40, DIG. 31, 196, 223, 48, 26, 45, 201; 49/280, 348, 394, 399

[56] References Cited

U.S. PATENT DOCUMENTS 5,337,977  8/1994  Fleming ............................. 249/129.5

OTHER PUBLICATIONS

EPO 0105082 Publ. Apr. 1984, *Kasper*.

*Primary Examiner*—Galen L. Barefoot
*Attorney, Agent, or Firm*—Christensen, O'Connor, Johnson & Kindness PLLC

[57] ABSTRACT

A latch-lock mechanism for an airplane cargo door (34) is disclosed. The latch-lock mechanism includes straight-through drive shafts rotated by a common powered drive unit (61). Affixed to the outer ends of the drive shafts are pull-in hooks (67) that co-act with pull-in pins affixed to the fuselage of the airplane adjacent to the sides of the cargo door opening. The co-action between the pull-in hooks and the pull-in pins pulls the cargo door into a closed position against a distorted fuselage cargo door opening. During opening, the co-action between the pull-in hooks and the pull-in pins force the door open against ice jams. After being pulled into a closed position, latch cams (89) rotated by the drive shafts are closed around latch pins (131). Thereafter, lock pawls (159) are moved into a closed position. The latch-lock mechanism also includes witness ports (193) located in the cargo door (34) that enable a mechanic to verify that the lock pawls (159) are in the closed position. The lock pawls (159) are prevented from closing unless they "feel" that the associated latch cam (89) is closed. The latch-lock handle mechanism also includes a lock handle housing (141) that must be opened in order to access a manual drive 90° gear box (71) used to manually operate the power drive unit (61) and, thus, rotate the drive shafts. Further, mechanical fusing is provided to prevent the application of excessive manual force to the latch-lock mechanism. The lock handle housing (141) is closed by a lock handle (203) having latch whose holding force must be overcome by a pull force, which eliminates the possibility of the door being opened by hydrodynamic water pressure.

14 Claims, 9 Drawing Sheets

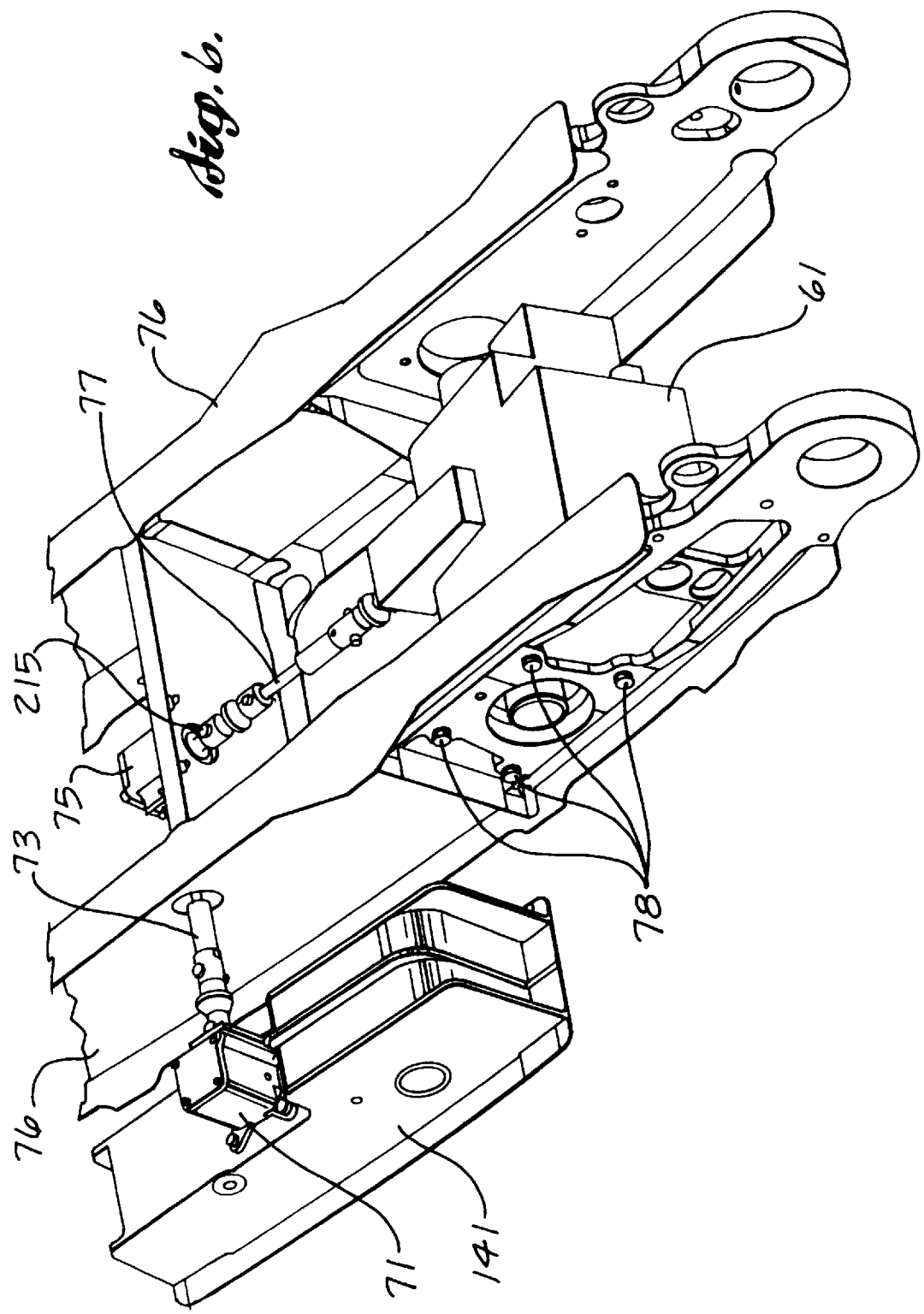

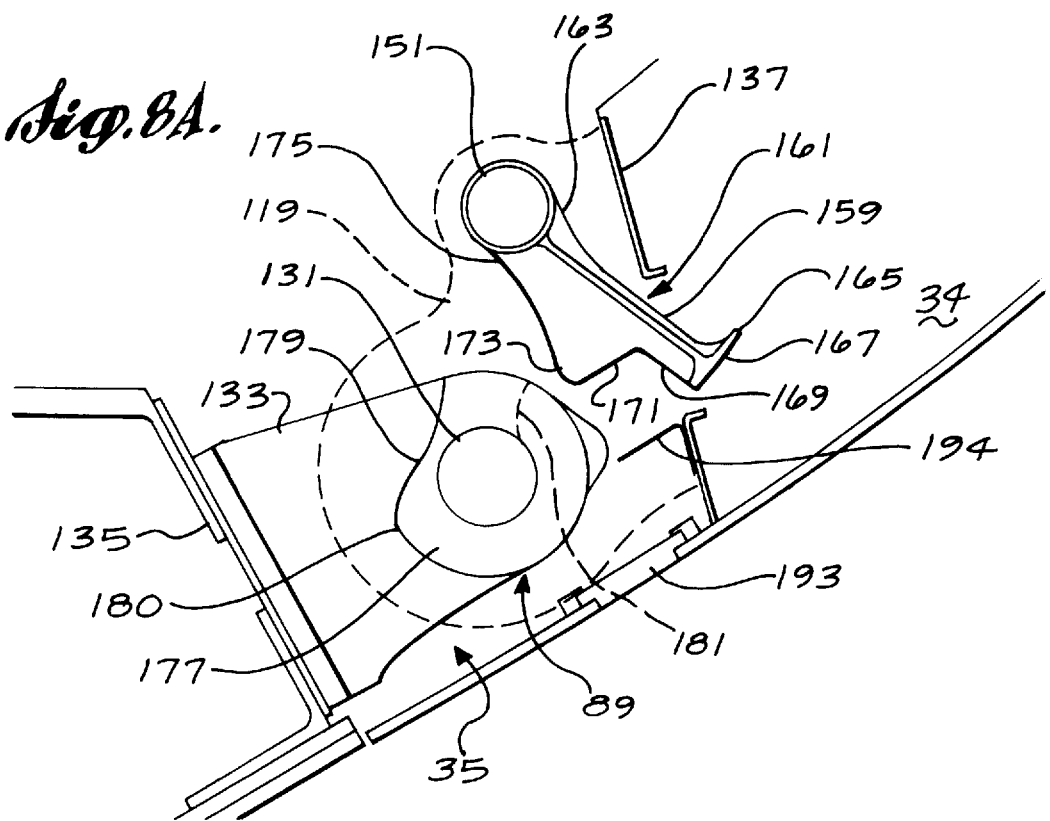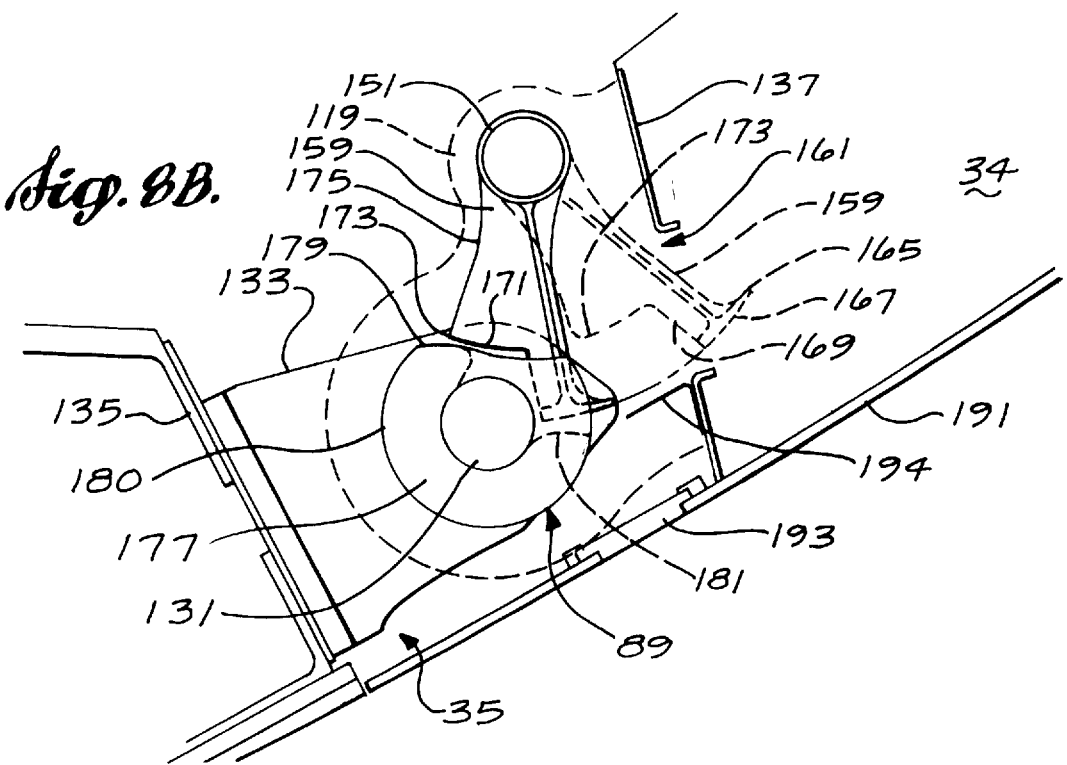

LATCH-LOCK MECHANISM FOR LOAD CARRYING AIRPLANE CARGO DOORS

TECHNICAL AREA

This invention relates to latch-lock mechanisms and, more particularly, to latch-lock mechanisms for airplane cargo doors.

BACKGROUND OF THE INVENTION

Contemporary commercial airplanes are commonly provided with a multiplicity of ingress and egress openings in the lower lobe of the airplane fuselage to permit on-loading and off-loading of baggage, cargo, and the like into and from the cargo hold of the airplane. The ingress and egress openings into the cargo hold are enclosed by cargo doors. Cargo doors vary widely in terms of their construction and operation. Many cargo doors are electrically powered, outwardly opening, canopy-type doors as contrasted with inwardly opening, plug-type doors of the type often used to permit passenger ingress and egress. Canopy-type cargo doors, which are hinged along the top, must be designed such that the interior airplane cabin can be pressurized only when the doors are fully and properly closed, latched, and locked. In this regard, it has been a common practice to provide relatively small vent doors in cargo doors in order to prevent pressurization of the airplane cabin to an unsafe level. The cargo door and the vent door actuation mechanisms are designed and interrelated such that closure of the vent doors is precluded in the event that the cargo door is not fully and properly closed and latched, thereby preventing pressurization of the interior of the airplane.

As the airplane industry has become more highly mechanized and the cargo capacity of relatively large airplanes has increased, it has become common place to employ relatively sophisticated cargo/baggage handling systems. Sophisticated cargo/baggage handling systems enable the on-loading and off-loading of containerized and/or palletized cargo that occupy relatively large volumes of space. As the cargo handling system, cargo containers, and cargo pallets have increased in size, it has been necessary to increase the size of cargo ingress/egress openings in airplane fuselages. As a result, it has been necessary to develop relatively large cargo doors to close such openings. As cargo doors have increased in size and weight, the mechanisms for latching and locking cargo doors has become more complex and bulky. In many instances, a significant portion of such mechanisms are mounted on the fuselage structure and/or interconnected to the cargo door in such a manner that the mechanisms project into the fuselage ingress/egress openings when the cargo door is open, thereby significantly decreasing the effective area of the opening and limiting the size of the cargo containers and/or pallets that can be freely passed through such openings. Moreover, as the cargo storage capacity of airplanes has increased, so has the potential for a fully loaded aircraft to have a slightly distorted fuselage body structure. Distortion of the fuselage body structure tends to produce alignment problems when attempting to close a cargo door. Misalignment can result in jamming of the door closing and latching mechanisms.

One type of aircraft cargo door latching and locking mechanism designed to overcome the foregoing problems is described in U.S. Pat. No. 4,473,201, entitled "Canopy-Type Aircraft Cargo Door and Actuating Mechanisms" by Franklin K. Barnes et al. (hereinafter '201 patent). While the cargo door latching and locking mechanism described in the '201 patent has proven to be a substantial advance over prior art cargo door latching and locking mechanisms, it is subject to improvement. The present invention is directed to providing an improved closing, latching, and locking mechanism for a canopy-type airplane cargo door of the type generally described in the '201 patent.

SUMMARY OF THE INVENTION

In accordance with this invention, a latch-lock mechanism for a canopy-type airplane cargo door is provided. The latch-lock mechanism includes straight-through drive shafts rotated by a common power drive unit (PDU). Affixed to the outer ends of the drive shafts are pull-in hooks that co-act with pull-in pins affixed to the fuselage of the airplane adjacent to the cargo door opening. The co-action of the pull-in hooks with the pull-in pins pulls the cargo door closed. The straight-through drive shafts are also coupled to and operate latch cams that co-act with latch pins located around the periphery of the cargo door opening in the fuselage of the airplane. After the latch cams capture the latch pins and are fully closed, lock pawls operated by a lock handle are moved into position. The lock pawls are positioned and constructed such that they cannot be moved into a lock position unless latch cams located along the bottom edge of the door are fully closed. In essence, the lock pawls are prevented from closing unless they "feel" that the associated latch cam is closed. Preferably, a torque fuse is included in the coupling between the lock handle and the lock pawls to prevent excessive force being used to close the lock handle when the lock pawls are not fully closed.

In accordance with further aspects of this invention, the latch-lock mechanism includes witness ports located adjacent to the latch cam/latch pin/lock pawl combination so that a mechanic can determine if associated latch cams and lock pawls are in a closed position.

In accordance with other aspects of this invention, the latch-lock mechanism includes a lock handle housing mounted on the airplane cargo door that is opened by rotating the lock handle outwardly. Mounted for access via the lock handle housing is a manual drive 90° gear box that is coupled to the PDU to allow the drive shafts to be manually operated in the event electrical power is not available or the PDU has failed. Thus, the drive shafts are only manually operable if the lock pawls are open, which occurs when the lock handle is moved to the open position, allowing access to the manual drive 90° gear box. Preferably, located in the coupling between the manual drive 90° gear box and the PDU is a torque fuse that prevents excessive manual power from being applied to the drive shafts.

In accordance with still further aspects of this invention, the lock handle is held closed by a catch whose holding power is overcome by a pull force, eliminating the possibility of the door being opened by external pressure.

In accordance with still other aspects of this invention, the lock pawls are trapped between the latch cams and the latch pin supporting structure. As a result, the latch pins are prevented from slipping sideways off the latch cams.

In accordance with yet still other aspects of this invention, rather than being mounted on stub shafts keyed to the inside of the latch cam drive shafts, the latch cams are located on the ends of stub shafts keyed to the outside of the latch cam drive shaft to provide a more direct fail safe load path.

In accordance with yet still further principles of this invention, a secondary over-travel stop is provided to limit the movement of drive links that couple the PDU drive shafts to the latch cam drive shafts to prevent injuring the skin of the airplane cargo door.

In accordance with still yet further aspects of this invention, the lock handle also operates an interlock that prevents the pressure vent door of the airplane cargo door from opening unless the lock handle is open.

As will be readily appreciated from the foregoing summary, the invention provides a new and improved latch-lock mechanism for an airplane cargo door. The use of straight-through drive shafts results in fewer components and a more easily installed system when compared to systems of the type described in the '201 patent. In addition, a latch-lock mechanism formed in accordance with this invention is lighter in weight because it does not require heavy, cantilevered bearing blocks. Nor are large elongated holes fitted with heavy bosses in latch frame bearings required. Because the system is less complex, installation time is significantly reduced over the installation time of systems of the type described in the '201 patent. The use of a visible lock pawl allows mechanics and others to be certain that cargo doors, including latch-lock mechanisms formed in accordance with the invention, are fully closed and locked. The inclusion of a torque fuse in the manual drive mechanism and in the lock panel closure mechanism prevents excessive manual force from being applied either to the drive shafts or to the lock handle closure. Further, placing access to the manual drive 90° gear box in the lock housing prevents inadvertent manual operation. The use of a lock handle that requires a pull force to open eliminates the possibility of the door being opened by external pressure in the unlikely event an airplane incorporating a latch-lock mechanism formed in accordance with the invention is required to make a water landing. Likewise, the interlock between the lock handle and the pressure vent door prevents the pressure vent door from opening in the unlikely event of a water landing.

BRIEF DESCRIPTION OF THE DRAWINGS

The foregoing features and other advantages of this invention will become more readily appreciated as the same become better understood by reference to the following detailed description, when taken in conjunction with the accompanying drawings, wherein:

FIG. 6 is an enlarged isometric view of the coupling mechanism shown in FIG. 3 that couples the manual drive 90° gear box to the power drive unit;

FIGS. 8A and 8B are cross-sectional views along line 8—8 of FIG. 7;

DETAILED DESCRIPTION OF THE PREFERRED EMBODIMENT

Figure 1:
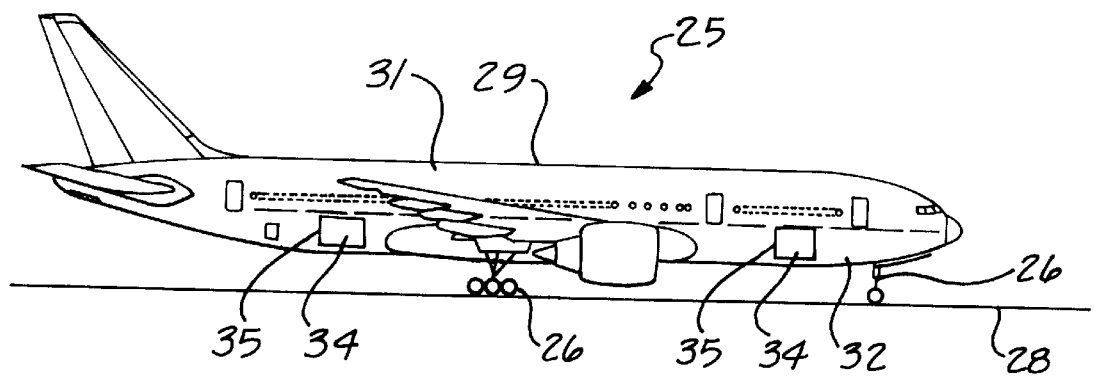
FIG. 1 is a side elevational view of an airplane containing a large cargo door.

FIG. 1 illustrates a conventional, large-capacity, commercial passenger airplane 25 supported on the ground 28 by landing gear 26. As is common with this type of airplane, the fuselage 29 is divided by a horizontal transverse deck 30 into an upper lobe 31 and a lower lobe 32. The upper lobe 31 contains the passenger cabin, the cockpit of the airplane, galleys, lavatories, and storage areas for carry-on luggage. The lower lobe 32 contains forward and aft cargo holds.

In the exemplary airplane 25 shown in FIG. 1, access to the forward cargo hold is provided by a relatively large cargo door 34, which incorporates a latch-lock mechanism formed in accordance with the present invention. The door is shown positioned within a doorway 35 formed in the right or starboard wall of the fuselage 29 in the region of the forward cargo hold. As will be appreciated by those skilled in the art, the particular location and size of the exemplary cargo door 34 is not critical to the present invention. That is, a cargo door embodying the present invention can be located in the forward cargo area, as shown, in the aft cargo area, in both cargo areas or, for that matter, on either of the both of the port and starboard sides of the fuselage 29. The latch-lock mechanism of the present invention finds particularly advantageous use in connection with load carrying cargo doors 34.

Figure 2:
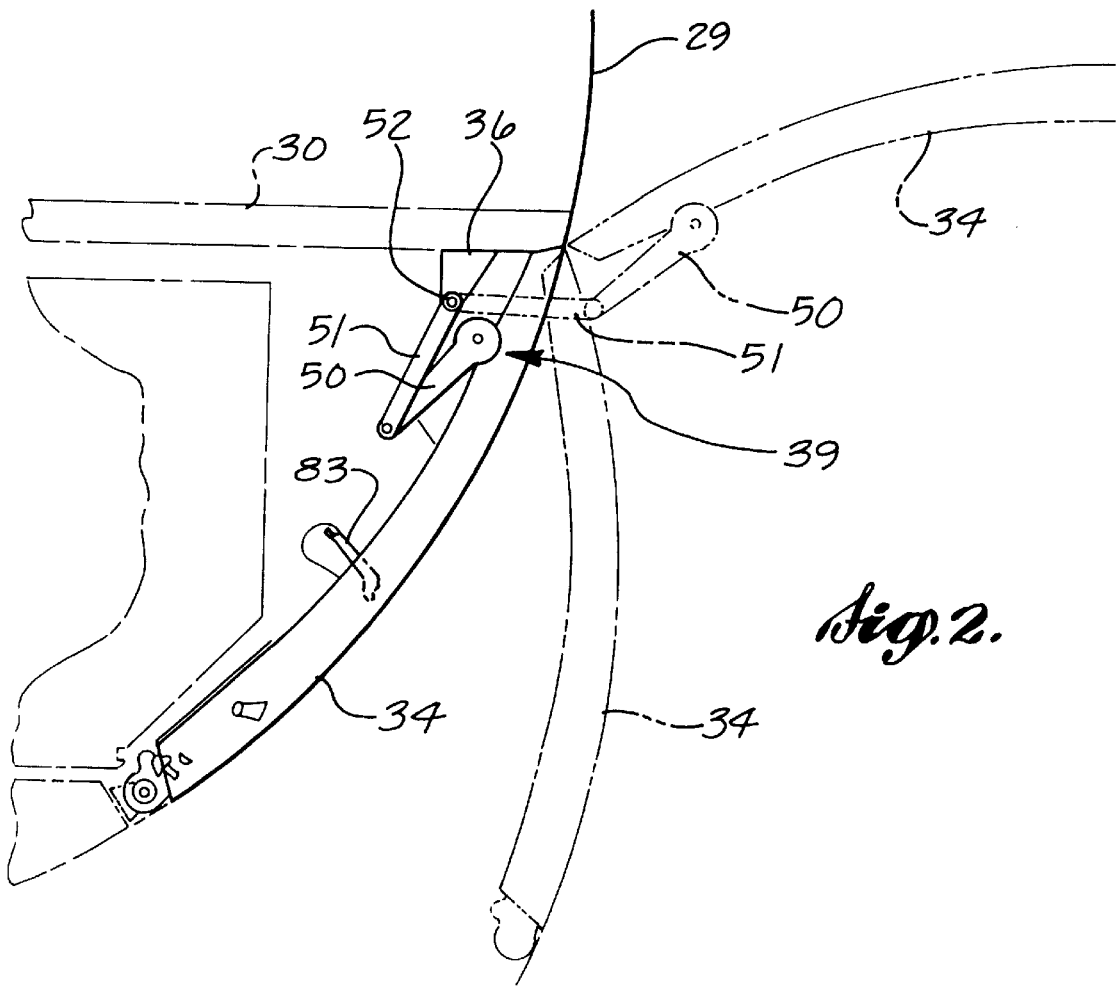
FIG. 2 is a cross-sectional view illustrating in more detail the large cargo door illustrated in FIG. 1.

As shown in FIG. 2, by way of example, the cargo door 34, which is an outwardly opening canopy-type door of generally conventional frame skin construction, is pivotally connected by hinge mechanisms 39 to the fuselage 29 of the airplane 25. The hinge mechanisms 39 are located along the upper edge of the door 34. The hinge mechanisms 39 control the opening and closing of the cargo door 34, i.e., the movement of the cargo between a first fully open position shown in phantom in FIG. 2, and a second position whereat the door 34 is slightly ajar adjacent its lower edge. Two hinge mechanisms 39 are mounted on and carried by the door 34, one adjacent the forward upper edge of the door and the other adjacent the aft upper edge of the door. During door closure, the cargo door 34 is first moved to the slightly ajar position by the hinge mechanisms. Thereafter, the door 34 is first latched in place by means of a latch-lock mechanism formed in accordance with the invention and described more fully below. After being latched, the door is locked in place by means of the latch-lock mechanism.

For purposes of completeness, prior to describing the latch-lock mechanism of the invention, a brief description of the hinge mechanism 39 is set forth. The exemplary hinge mechanism 39 illustrated in FIG. 2 is operated by a rotary actuator (not shown) coupled to a hinge power drive unit (not shown) by means of a torque tube (also not shown). The output of the torque tube is transmitted by a short output shaft (not shown) to a drive linkage assembly of the hinge mechanism shown in FIG. 2. The drive linkage assembly comprises a drive arm 50 drivingly coupled at one end to the short output shaft and pivotally connected at its opposite end to one end of a link 51. The opposite end of the link 51 is, in turn, pivotally connected at point 52 to a bracket 36 mounted to the body of the airplane fuselage.

The hinge actuating mechanism is such that when the cargo door 34 is unlocked, fully unlatched, and in a slightly ajar position, energization of the hinge power drive unit transmits torque via the torque tubes to the fore and aft rotary actuators and, hence, to the output shaft that is connected to the fore and aft drive linkage assemblies, formed by the drive arm 50 and the link 51, causing the canopy-type door 34 to be pivoted outwardly and upwardly. At the fully opened position, a limit switch (not shown) is actuated to deenergize the hinge power drive unit. The cargo door 34 remains open until a door closing cycle of operation is initiated, at which time the hinge power drive unit is again energized to drive the fore and aft drive linkage assemblies in the opposite direction towards the door closed position. A second limit switch (also not shown) is provided for deenergizing the hinge power drive unit when the cargo door reaches a second position in which the door, although substantially closed, is slightly ajar defining a gap of about 2.5 inches between the lower door edge and the horizontal sill of the doorway 35. The latch-lock mechanism of the present invention is then actuated in the manner hereinafter described to latch and lock the door closed. FIG. 2 also illustrates that the door 34 includes one or more vent doors 83. Reference is made to the '201 patent, more fully referenced above, the subject matter of which is incorporated herein by reference, for a more complete description of a hinge actuating mechanism of the type briefly described above.

Figure 3:
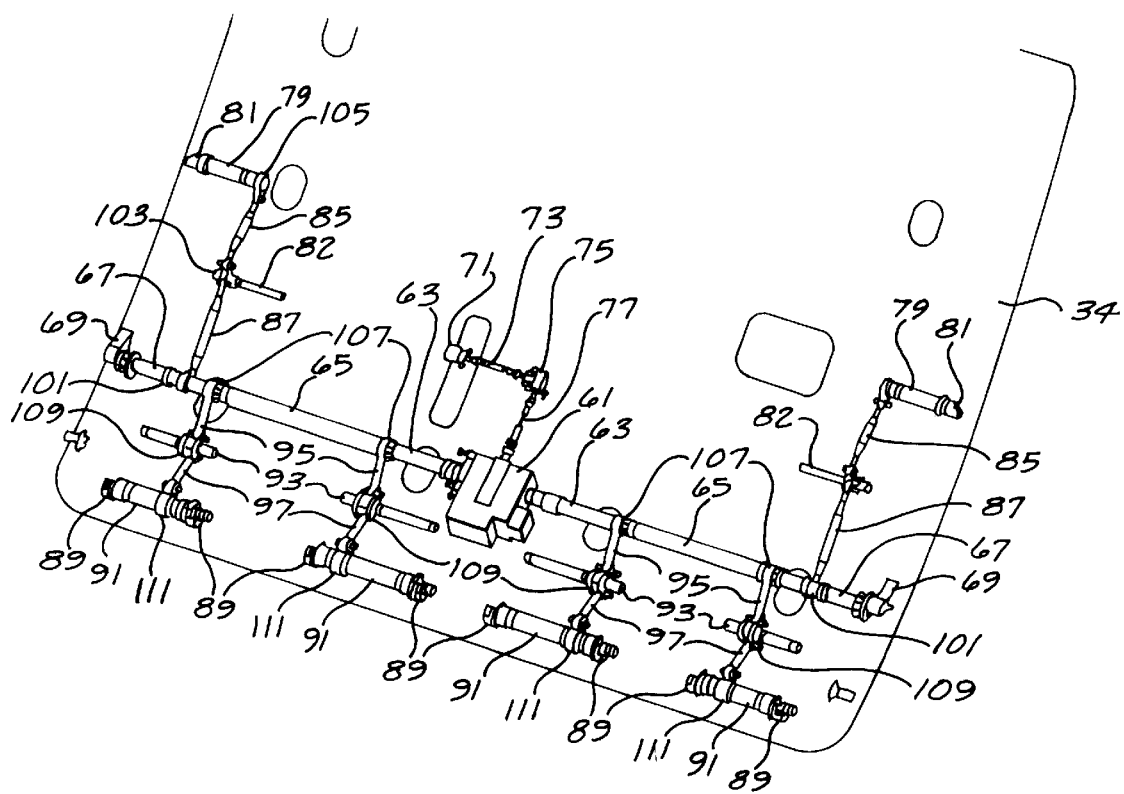
FIG. 3 is a perspective view of the latch portion of a latch-lock mechanism formed in accordance with the invention.

The present invention is directed to providing a new and improved latch-lock mechanism of the general type described in the '201 patent with certain improvements designed to overcome some of the disadvantages of latch-lock mechanisms of the type described in the '201 patent and to comply with contemporary Federal Aviation Administration regulations. The improvements are designed to reduce weight and complexity, increase reliability, and provide other advantages described below FIG. 3 is a pictorial view illustrating the major components of the latch portion of a latch-lock mechanism formed in accordance with the invention. The latch portion comprises a latch power drive unit (PDU) 61; two latch drive shafts 63; two connector shafts 65; two pull-in hook shafts 67; two pull-in hooks 69 integrally formed on the ends of the pull-in hook shafts; a manual drive 90° gear box 71; a manual drive shaft 73; a 90° gear box 75; a coupling shaft 77; two mid-span drive shafts 79; two mid-span drive latches 81 integrally formed on the ends of the mid-span drive shafts; two mid-span idler shafts 82; two upper mid-span links 85; two lower mid-span links 87; eight latch cams 89; four latch cam drive shafts 91; four latch cam idler shafts 93; four upper latch cam drive links 95; and four lower latch cam drive links 97. While shown for the latch drive shafts 63, the connector shafts 65 and the pull-in hook shafts 67 in FIG. 4 and for the latch cam drive shafts 91 in FIG. 7, the support structures for supporting some of the other shafts are not illustrated in detail in the drawings. Suffice it to say that these shafts are mounted for rotation in suitable bearing supports when required or mounted in fixed positions about which other elements rotate, as necessary. In this regard, the drive shafts are mounted for rotation, while the idler shafts are mounted in fixed positions. As will be better understood from the following, bell cranks mounted on the idler shafts rotate about the idler shafts. Alternatively, the bell cranks could be affixed to the idler shafts and the idler shafts mounted for rotation.

In a conventional manner, the manual drive 90° gear box 71 is coupled to the PDU 61 by the manual drive shaft 73, the 90° gear box 75, and the coupling shaft 77. See FIG. 6. Preferably, the PDU 61 is mounted between a pair of frames 76, one of which supports the PDU via bolts 78.

The latch PDU 61 is a conventional drive unit and includes output shafts on opposed sides. Connected to and extending outwardly from the output shafts of the latch PDU 61 are the latch drive shafts 63. Coaxially affixed to and extending outwardly from the ends of the latch drive shafts are the connector shafts 65. Coaxially affixed to and extending outwardly from the ends of the connector shafts 65 are the pull-in hook shafts 67. The ends of the pull-in hook shafts extend through the end frames 68a (FIG. 4) of the door 34 and, thus, terminate at the lateral sides of the door. Preferably, the ends of the shafts are affixed or connected together by telescoping spline connections. As a result, the latch drive shaft segments, i.e., the latch drive shafts 63, the connector shafts 65, and the pull-in hook shafts 67, form a pair of straight-through drive shafts that, as shown in FIG. 3, extend outwardly from the latch PDU to the sides of the door 34. The pull-in hooks 69 are integral with the outer ends of the pull-in hook shafts 67.

Figure 4:
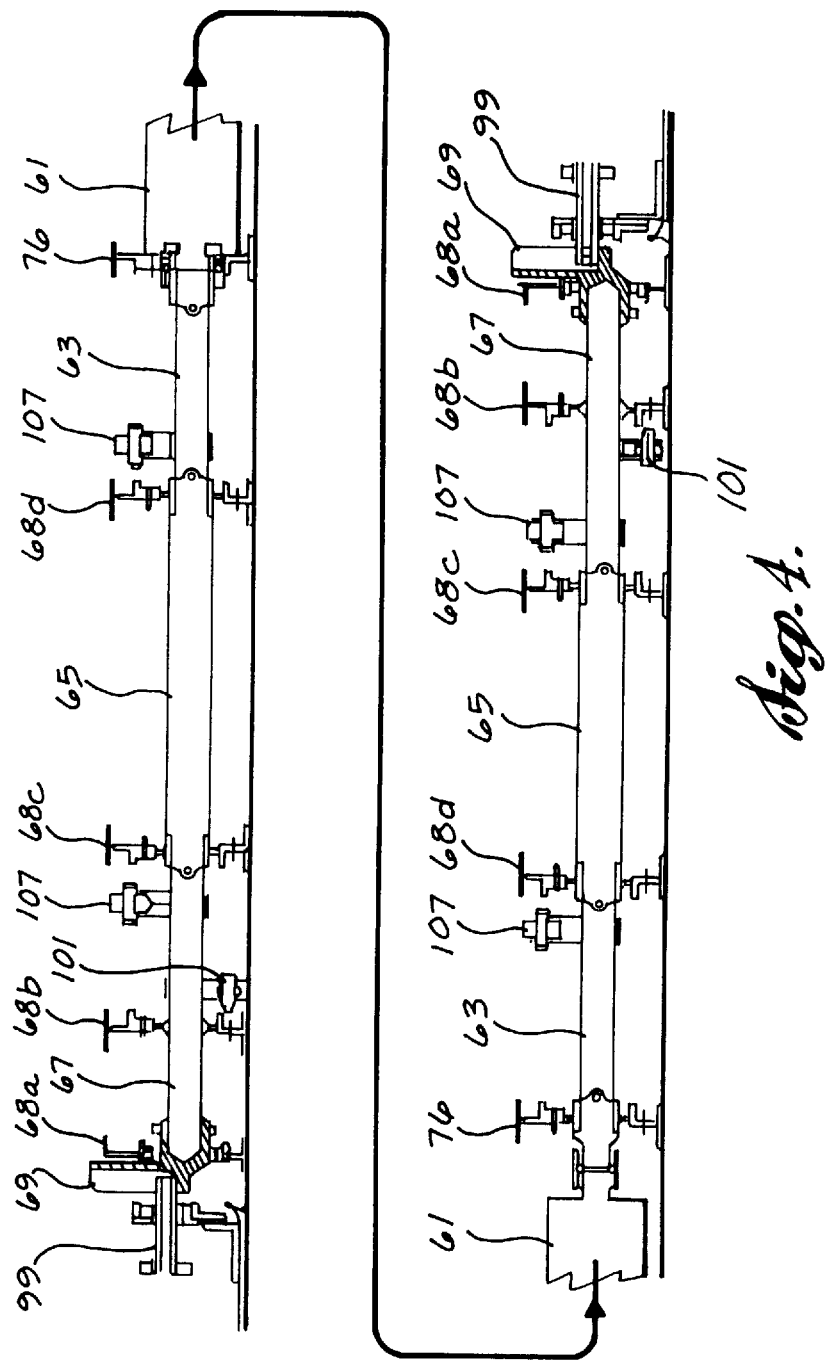
FIG. 4 is a longitudinal view of the drive shaft and power drive unit shown in FIG. 3.

The inclusion of straight-through latch drive shafts that extend through all of the frames 68a, 68b, 68c, . . . of the door, as shown in FIG. 4, and that can be assembled from the end frames 68a of the door 34 has a number of advantages over an offset drive shaft arrangement of the type illustrated and described in the '201 patent that does not pass through the end frames. A straight-through drive shaft allows the latch drive shaft segments to be easily installed, and the pull-in hook to be loaded through the end frames of the door 34 without simultaneously requiring the installation of bearing support blocks. Because the straight-through latch drive shafts illustrated in 3 and 4, and described above, have pull-in hooks that are in line with the latch drive shaft segments, bearing blocks can be pre-installed in each of the latch frame attachment fittings using only two attachment bolts. The bearing blocks are in line with the latch frame support fittings. As a result, there are fewer components to straight-through latch drive shafts of the type illustrated in FIGS. 3 and 4 and described above and their support bearing blocks than in an offset drive shaft arrangement of the type described in the '201 patent. In addition, the system is lighter because no heavy cantilevered bearing blocks are required. Further, no large elongated holes fitted with heavy bosses in latch frame bearings are required. Also, the installation time of a straight-through latch drive shaft of the type illustrated in FIGS. 3 and 4 is substantially less than the installation time of an offset drive shaft arrangement of the type illustrated and described in the '201 patent.

In operation, after the door 34 is moved to its slightly ajar position during closing and the latch PDU is actuated, the latch drive shaft rotates, causing the connector shaft and the pull-in hook shaft to rotate. This results in the pull-in hooks 69 capturing pull-in pins 99 located adjacent the door opening 35. As the shafts rotate and the pull-in hooks 69 capture the pull-in pins 99, the door is moved inwardly to a closed position, whereat it is latched by the latch-lock elements described below. The co-action between the pull-in hooks 69 and the pull-in pins 99 pulls the door 34 closed against a distorted cargo door opening. During opening, the co-action between the pull-in hooks and the pull-in pins forces the door open against ice jams, caused by freezing water.

Mounted on the pull-in hook shafts 67 are mid-span latch bell cranks 101. One end of each of the lower mid-span links 87 is rotatably attached to one of the mid-span latch bell cranks 101. The other end of each of the lower mid-span links 87 is rotatably attached to a mid-span idler bell crank 103 mounted on a related mid-span idler shaft 82. The upper mid-span links 85 connect the mid-span idler bell cranks 103 to mid-span drive shaft bell cranks 105 mounted on one end of the mid-span drive shafts 79. The mid-span latches 81 are integral with the other (outer) ends of the mid-span drive shafts 79. The coupling is such that after the cargo door is latched in the manner described above continued rotation of the pull-in hook shaft 67 by the latch PDU 61 causes the mid-span latches 81 to rotate about pins (not shown) affixed to the fuselage of the airplane in the sides of the doorway 35 adjacent to the mid-span latches. Since the mid-span latching mechanism illustrated in FIG. 3 and briefly described above is similar to the mid-span latching mechanism illustrated and described in detail in the '201 patent, it is not further described here. The purpose of the mid-span latches is to assure that the middle of the cargo door 34 is aligned with door frame to keep a pressure seal (not shown) in place. Some cargo doors may not require mid-span latches.

Mounted on the pull-in hook shaft 63 slightly inwardly from the mid-span bell cranks 101 are latch cam bell cranks 107. Latch cam bell cranks 107 are also mounted on the latch drive shafts 63, as shown in FIGS. 3 and 4. One end of an upper latch cam drive link 95 is rotatably connected to each of the latch cam bell cranks 107. The other end of each of the upper latch cam drive links 95 is rotatably connected to a latch cam idler bell crank 109 mounted on one of the latch cam idler shafts 93. The lower latch cam drive links 97 connect the latch cam idler bell cranks 109 to latch cam drive shaft bell cranks 111 mounted on the latch cam drive shafts 91. Two of the latch cams 89 are located at opposite ends of each of the latch cam drive shafts 91, as shown in FIGS. 3, 5, 7, 8 A, and 8 B, and described below.

Figure 5:
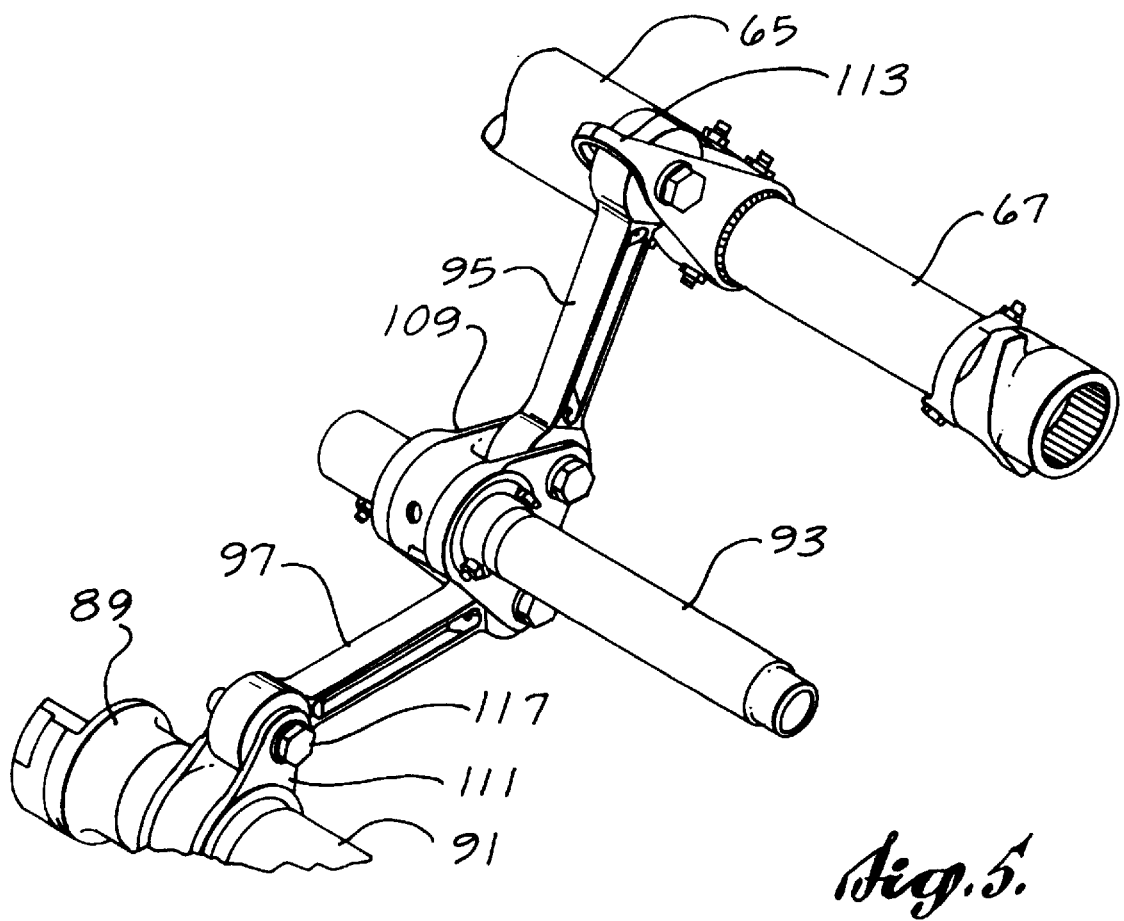
FIG. 5 is a detailed view of the coupling mechanism shown in FIG. 3 that couples drive shafts operated by a power drive unit to cam latch drive shafts.

FIG. 5 illustrates in detail the bell crank mechanism that couples the pull-in hook shafts 67 and the latch drive shafts 63 to the latch cam drive shafts 91. FIG. 5 also illustrates that, preferably, the latch cam bell cranks 107 include secondary over-travel stops 113. The secondary over-travel stops 113 comprise loops that extend over and enclose the attachment end of the upper latch cam drive links 95.

As will be readily appreciated by those skilled in the art and others, the over-travel stops 113 form a secondary over-travel stop. In this regard, in some instances the over-travel stop pin and crank incorporated in some types of airplane cargo door latch-lock mechanisms may be insufficient to fully prevent over-travel, resulting in bell cranks rotating past their stop position and damaging the outside skin of a cargo door. This result might be attributable to a variety of causes: misrigging of a failed primary stop pin or its supporting fitting, a failed latch drive shaft, a failed out-drive shaft from the latch PDU, or a failed over-travel crank arm on the latch drive shaft. Such failures can be costly and time consuming to repair. The secondary over-travel stop 113 illustrated in FIG. 5 and described above engages the upper latch cam drive link 95 if the bell crank overrotates. The stop resists the output of the latch PDU and prevents the bell crank from rotating through the outside skin of the cargo door. Since one over-travel stop alone may not be able to withstand the entire latch PDU torque output, preferably, two bell cranks include over-travel stops of the type illustrated in FIG. 5 and described above. As a result, cargo door skins are protected on both sides of the latch PDU. On one side is the primary over-travel stop pin and crank, and on the other side are two secondary over-travel stops of the type shown in FIG. 5.

Figure 7:
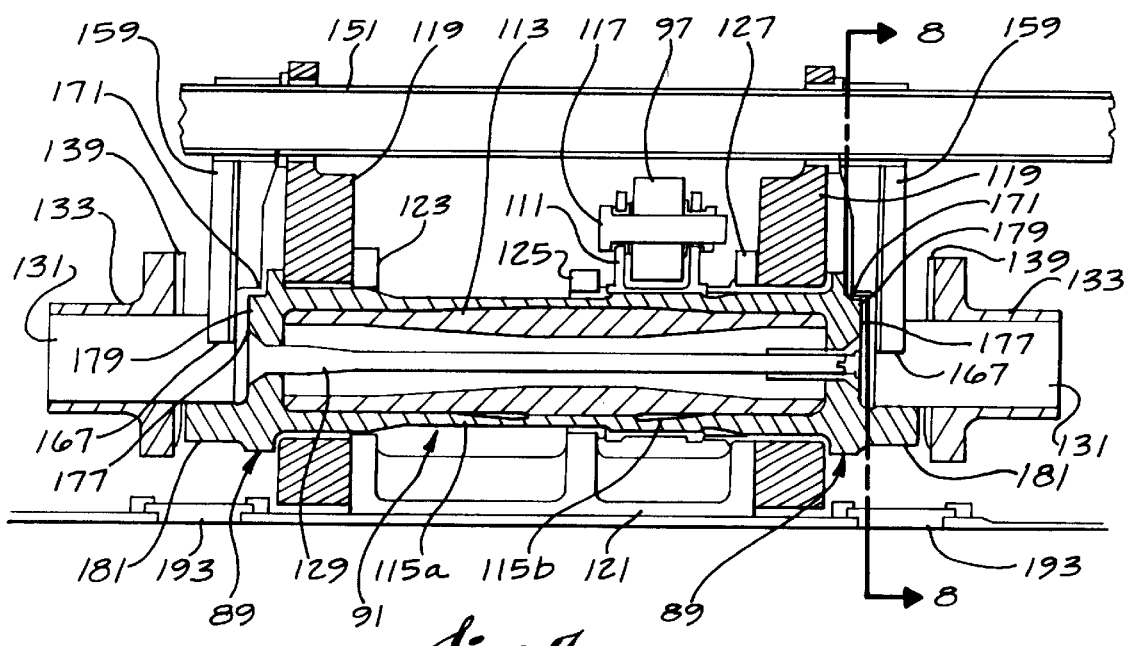
FIG. 7 is an elevational view, partially in section of the latch cam, latch pin and lock pawl illustrated in FIGS. 3 and 9.

FIGS. 7, 8A and 8B illustrate in detail the latch cams 89 and their interaction with latch pins 131 supported by latch pin support fixtures 133 mounted on the lower sill 135 of the doorway 35. FIG. 7 also illustrates the connection between the latch cam drive shaft bell cranks 111 and the related end of the lower latch cam drive link 97, as well as the structure of the latch cam drive shafts 91. The latch cam drive shafts 91 comprise a hollow central shaft 113. Splined to and mounted on the hollow central shaft 113 are a pair of stub shafts 115a and 115b. The stub shafts 115a and 115b extend inwardly from the outer edge of the hollow central shaft 113 and lie adjacent one another at their inner ends. Mounted on and splined to one of the stub shafts 115b is the associated latch cam drive shaft bell crank 111. As shown in FIGS. 5 and 7, the latch cam drive shaft bell crank 111 is rotatably connected to one end of the lower latch cam drive link 97 by a pin 117. The outer ends of the stub shafts 115a and 115b are mounted for rotation by bearings (not shown in detail) in latch frame support fixtures 119. The latch frame support fixtures 119 are mounted on the ends of a framework 121. The framework 121 includes webs 123, 125 and 127 that include holes through which the cam drive shaft 91 passes. One of the webs 125 surrounds the junction between the inner ends of the stub shafts 115a and 115b and forms a fail-safe lug shear tie. The structure of the latch cam drive shafts provides more direct fail safe load paths than does the latch cam drive shaft structure illustrated and described in the '201 patent.

The latch cams 89 are located on the ends of the stub shafts 115a and 115b. A longitudinal bolt 129 that extends through the center of the hollow central shaft 113 holds the stub shafts 115a and 115b together. The latch cams 89 co-act with the latch pins 131 supported by the latch pin support fixtures 133. As noted above, and as shown in FIGS. 8A and 8B, the latch pin support fixtures 133 are mounted on the lower sill 135 of the doorway 35. FIGS. 8A and 8B also show that the latch frame support fixtures 119 are attached to the lower beam 137 of the door 34.

After the pull-in hooks 69 have moved the door 35 to a closed position, the continued rotation of the latch drive shafts 63 causes the stub shafts 115a and 115b and, thus, the latch cams 89, to rotate about the latch pins 131. As a result, the latch cams 89 move through the partially closed position shown in FIG. 8A to the fully closed position shown in FIG. 8B. In the fully closed position, the door 34 is latched. Thereafter, when the lock mechanism, described below, is actuated, the latch cams are locked in position. Preferably, the latch pin support fixtures 133 include facing surfaces that surround the latch pins 131. The facing surfaces support alignment shims 139 that are inclined in a direction designed to position the latch cams between opposed pairs of latch pin support structures. The alignment shims are included to overcome door frame misalignment caused by airplane fuselage distortion. The latch cams are released from the latch position by energizing the PDU 61 to rotate the latch drive shafts in the opposite direction, i.e., in the direction opposite to the latch direction.

Figure 9:
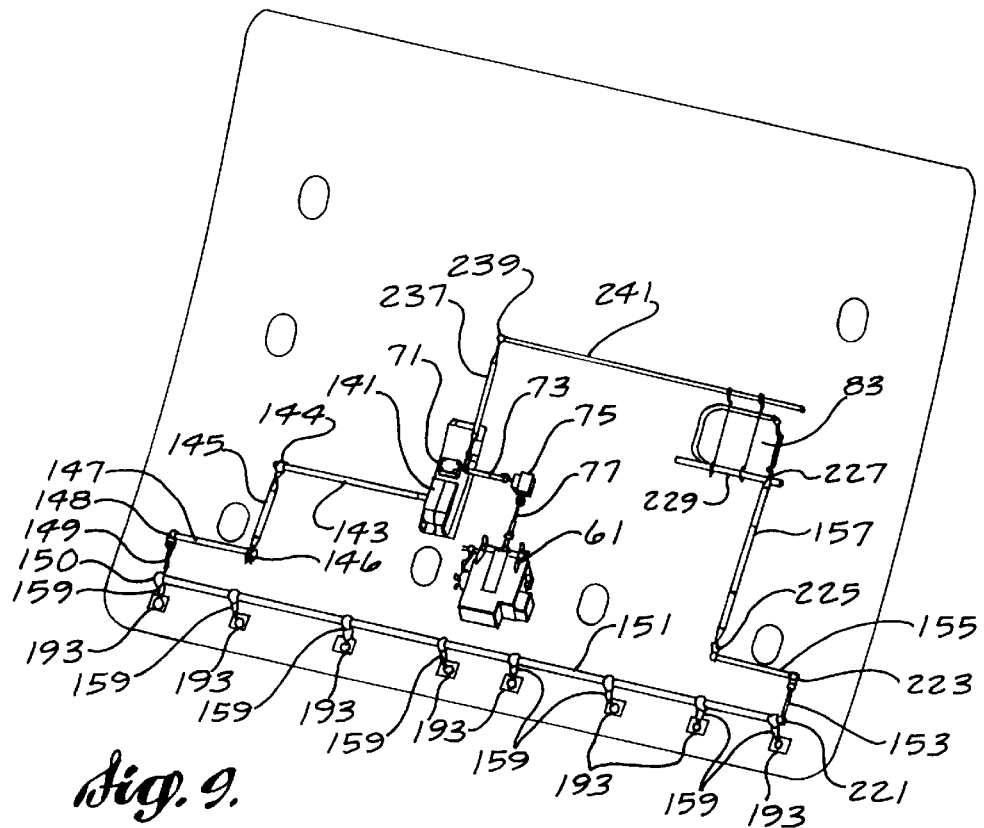
FIG. 9 is a perspective view of the lock portion of a latch-lock mechanism formed in accordance with the invention.

The major components of the lock portion of a latch-lock mechanism formed in accordance with the invention are illustrated in FIG. 9. The lock portion comprises: a lock handle housing 141 whose entrance is closed by a lock handle 203 (illustrated FIGS. in 10–12 and described below); a lock handle drive shaft 143; a long lock handle link 145; a lock handle idler shaft 147; a short lock handle link 149; a lock pawl shaft 151; a short pressure vent door (PVD) link 153; a PVD idler shaft 155; and a long PVD link 157. The lock handle drive shaft 143 extends outwardly from the lock handle housing 141 in a direction lying parallel to the lock pawl shaft 151, which lies parallel to the latch cam drive shafts 91, as shown in FIGS. 7, 8A and 8B. The outer end of the lock handle drive shaft 143 is rotatably connected to one end of the long lock handle link 145 by a bell crank 144. The other end of the long lock handle link 145 is rotatably connected to one end of the lock handle idler shaft 147 by a bell crank 146. The other end of the lock handle idler shaft 147 is rotatably connected to one end of the short lock handle link 149 by a bell crank 148. The other end of the short lock handle link 149 is rotatably connected to one end of the lock pawl shaft 151 by a bell crank 150. As a result of the foregoing coupling, when the lock handle drive shaft 143 is rotated by movement of the lock handle 203 between open and closed positions in the manner hereinafter described, the lock pawl shaft 151 is rotated.

As shown in FIGS. 8A and 8B, the lock pawl shaft 151 is supported for rotation by the latch frame support fixtures 119. Mounted on the lock pawl shaft 151 are eight lock pawls 159, one aligned with each of the eight latch cams 89.

As illustrated in FIGS. 8A and 8B, the lock pawls 159 are movable between a retracted position (FIG. 8A) and a closed or locked position (FIG. 8B). Movement of the lock handle to the closed position moves the lock pawls to the closed or locked position and movement of the lock handle to the open position moves the lock pawls to the retracted position. In the retracted position, the outer end of the lock pawls 159 extend into an aperture 161 formed in the lower beam 137 of the door 34. In the closed or locked position, the lock pawls 159 overlie an open section of the latch cams 89.

As illustrated in FIGS. 8A and 8B, when viewed from the side, i.e., transverse to the longitudinal axis of the lock pawl shaft 151, the trailing edge of the lock pawls 159, i.e., the edge facing the lower beam 137, extends outwardly from the lock pawl shaft 151 and then curves rearwardly to form a tip 165. The tip joins the end of a foot 167 whose leading end terminates at an inwardly protruding leading edge 169, i.e., a leading edge that extends toward the lock pawl shaft 151. The inwardly protruding leading edge 169 terminates at a forwardly protruding edge 171 that ends at a corner 173. The corner is also formed by the remaining portion of the leading edge 175 of the lock pawl. The remaining portion of the leading edge 175 curves toward and terminates at the lock pawl shaft 151.

As shown in FIGS. 7, 8A and 8B, the inner section 177 of the latch cams 89 is circular and includes a convexly shaped cutaway edge 179. The convexly shaped cutaway edge 179 is shaped to conform to the shape of the forwardly protruding edge 171 of the lock pawl 159 when the latch cams 89 are fully closed, as shown in FIG. 8B. Prior to latch cam closure, the non-cutaway edge 180 of the inner section 177 of the latch cams 89 is sized to impinge on the corner 173 of the lock pawls 159 if the lock pawls are moved from their retracted position (FIG. 8A) to their locked position (FIG. 8B).

The latch cams 89 have an outer section 181 that is semicircular in shape. The semicircular shape is sized to receive the ends of the latch pins 131, as shown in FIGS. 8A and 8B. As shown in FIG. 7, the foot 167 of each of the lock pawls 159 is aligned with a semicircular outer sections 181 of the latch cams 89. When the latch cams are fully closed, as shown in FIG. 8B, the latch pins are captured by the latch cams 89 and the latch cams are positioned such that the lock pawls can be moved into a position where the forwardly protruding edge 171 of the lock pawls is aligned with the convexly curved cutaway edge 179 of the inner section 177 of the latch cams 89 and the feet 167 of the lock pawls are positioned behind the lock pins 131.

Figure 10:
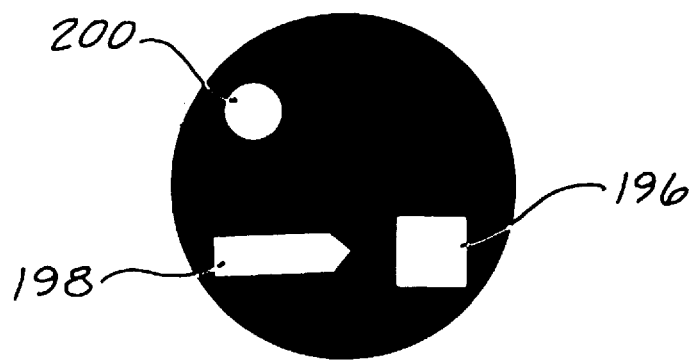
FIG. 10 is a pictorial view of latch cam, latch pin and lock pawl targets.

Formed in the outer skin 191 of the door 34 are witness ports 193. Eight witness ports are included, one adjacent each of the latch cam/latch pin/lock pawl combinations located along the lower edge of the door 34. The witness ports 193 are positioned so as to allow a mechanic to determine if the latch cams are closed and if the lock pawls are in a closed or open position. When the lock pawls 159 are retracted, they are hidden from view through the witness ports by flanges 194 positioned on the witness port side of the apertures 161 formed in the lower beam 137 of the door 34. Preferably, portions of the lock pawl, cam latch, and latch pin support fixture are painted yellow on a black background so that mechanics looking through the witness ports can verify that the latch cams are closed about the latch pins and the lock pawls are in their closed position. More specifically, as shown in FIG. 10, a latch target 196, preferably in the form of a bright yellow square, is painted on a black background on each of the latch pin support fixtures 133. The latch targets are positioned so as to be viewable through the witness ports 193. Painted on each of the latch cams is an arrow 198, again, preferably, the arrow in yellow on a black background. The arrows are positioned so as to be aligned with their related targets 196 when the latch cams are closed. The arrows are, of course, also viewable through the witness ports 193. Painted on the outer surface of the foot 167 of each of the lock pawls 159 is an image, such as a circle 200, also preferably in yellow on a black background. The images are viewable through the witness port when the lock pawls are closed.

The shape of the lock pawls 159 is different from the shape of the lock selectors illustrated and described in the '201 patent. In essence, the lock pawls cannot be closed unless they "feel" that the latch cams are closed. Preferably, the lock pawls 159 are formed so as to be strong enough to react to opening torque created by the latch PDU 61 by direct compression rather than through shear and bending. As illustrated in FIG. 7, the lock pawls are fairly wide, providing a sizable "purchase" area against the latch cams. Further, because the lock pawls are located between the inner sections 177 of the latch cams 89 and the latch pin support fixtures 133, they are trapped and cannot slip sideways off the latch cams. The lock pawls form compression style jam stops as opposed to shear and bending style stops. Any one lock pawl is able to withstand the full opening torque produced by the latch PDU 61.

Figure 11:
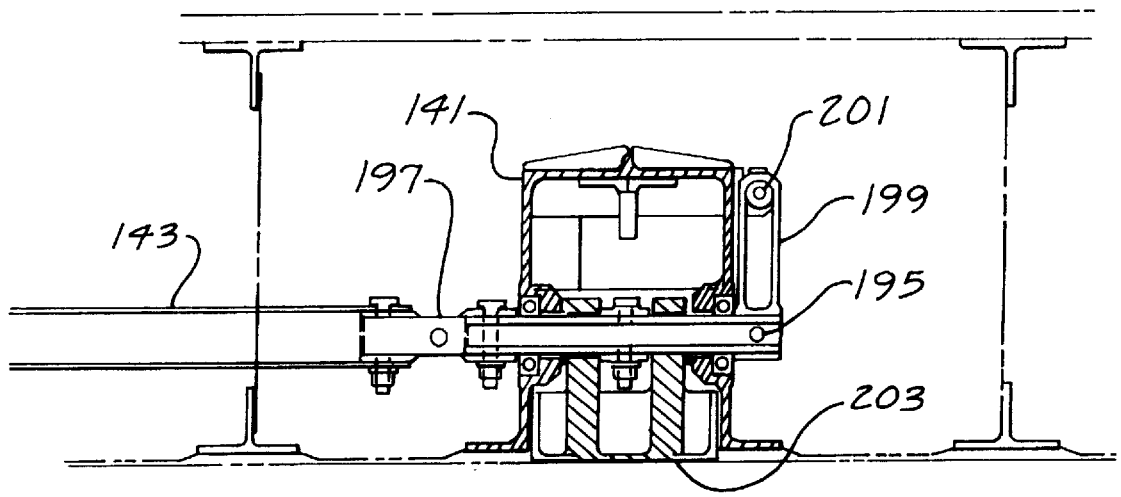
FIG. 11 is a cross-sectional view of a lock handle housing and a lock handle of a latch-lock mechanism formed in accordance with the invention.

As illustrated in FIG. 11, a lock handle shaft 195 extends through the lock handle housing 141. One end of the lock handle shaft 195 is connected via a torsion fuse 197 to the lock handle drive shaft 143. The other end of the lock handle shaft 195 is connected to one end of an over-travel crank 199 positioned to impinge on an over-travel stop 201 attached to the adjacent wall of the lock handle housing 141.

Figure 12:
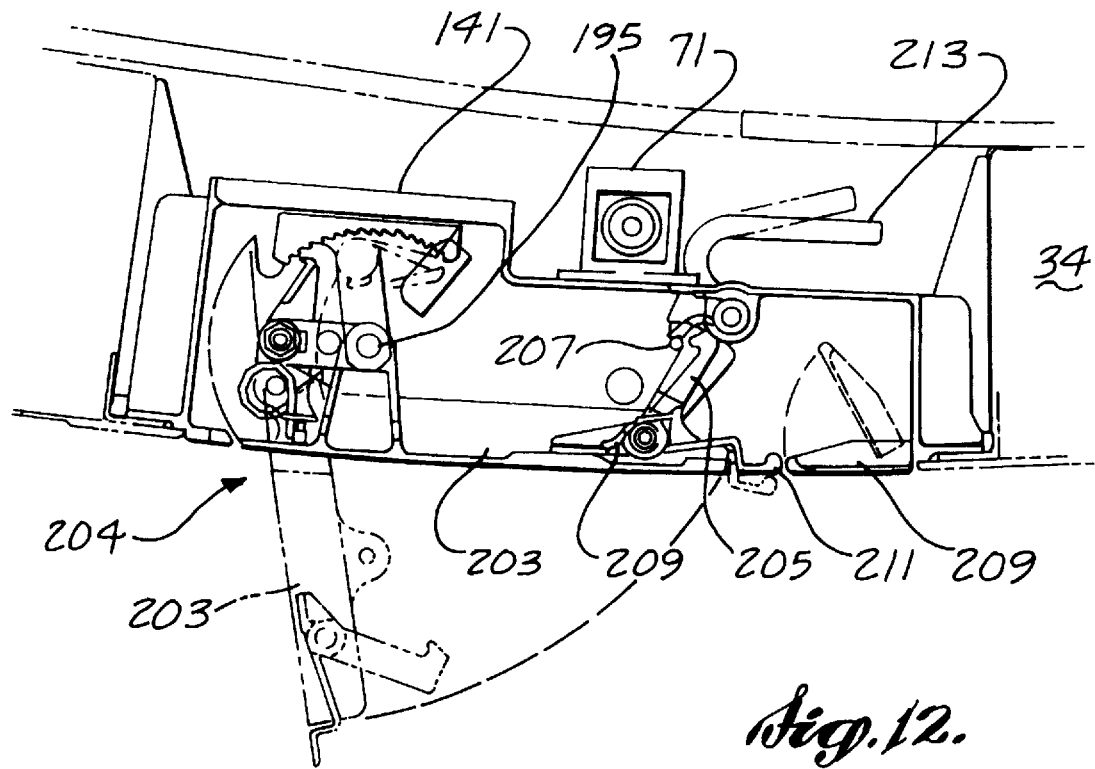
FIG. 12 is another cross-sectional view of a lock handle housing and a lock handle formed in accordance with the invention taken orthogonal to the view shown in FIG. 11.

As shown in FIG. 12, the lock handle housing 141 has an opening on the outside of the door 34. The opening is closed by the lock handle 203. The lock handle 203 is supported by and coupled to the lock handle shaft 195 by a hinge assembly 204 similar to that described in the '201 patent, which has been incorporated herein by reference. As a result, the lock handle hinge assembly 204 is not described here. Only the main differences between the lock handle latch mechanism of the present invention and the lock handle latch mechanism of the '201 patent are described.

The main difference between the lock handle latch mechanism of the present invention and the lock handle latch mechanism illustrated and described in the '201 patent relates to the inclusion of a hook 205 rotatably connected to the handle end of the lock handle 203. The hook is spring-loaded toward a catch pin 207, mounted in the lock handle housing 141, by a torsion spring 209. Located adjacent to the handle end of the lock handle 203 is a hinged access cover 209. When the access cover is moved inwardly to the open position, the inner side of the catch end 211 of the lock handle is accessible to a mechanic's fingers. Pulling on the catch end 211 of the lock handle outwardly with sufficient force moves the hook 205 away from the catch pin 207, detaching the lock handle. Thereafter, the lock handle 203 can be moved to the open position illustrated in phantom in FIG. 12.

Figure 14:
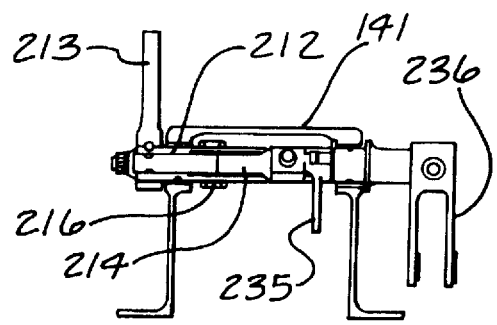
FIG. 14 is a cross-sectional view of the lock handle housing taken orthogonal to the views shown in FIGS. 12 and 13 showing the mounting mechanism for the internal release and the PVD interlock lock handle connection.

An internal release in the form of a U-shaped arm 213 positioned to co-act with the inner end of the hook 205 can be used to release the hook 205 from inside the door 34 to allow the latch handle to be manually opened from inside the door. As shown in FIG. 14, a short leg of the U-shaped arm 213 is attached to the outer end of a sleeve 212 mounted on a shaft 214 that extends through the lock handle housing 141. Mounted on the sleeve 212, inside of the lock handle housing in alignment with the hook 205, is a protrusion 216 positioned to interact with and move the hook 205 away from the catch pin 207 when the long leg of the U-shaped arm is pulled outwardly away from the door 34.

The hook 205 and the catch pin 207 are designed such that a mechanic closing the lock handle 203 will feel the hook 205 riding over the catch pin while closing the lock handle. As a result, the mechanic will sense that the lock handle catch has been pushed home. A mechanic can also open the access cover 209 and look into the lock handle housing to see that the hook 205 has captured the pin 207.

As illustrated in FIGS. 6 and 12, the manual drive 90° gear box 71 is mounted on the rear face of the lock handle housing 141. As a result, the manual drive 90° gear box is only accessible if the lock handle is open. Once the lock handle is closed and the lock pawls are in position, the manual drive 90° gear box is not accessible. As a result, airline mechanics are prevented from manually opening the latch cams when the lock pawls are in place. This prevents the application of unwanted strain to and wear on the lock pawls and latch cams. In addition, preferably, a torsional fuse 215 is located in the linkage between the manual drive 90° gear box 71 and the PDU 61. Preferably, the torsional fuse 215 is located in the coupling shaft 77 that connects the 90° gear box 75 to the latch PDU 61.

As shown in FIG. 9, the end of the lock pawl shaft 151 remote from the end connected to the lock handle drive shaft 143 is rotatably connected by a bell crank 221 to one end of the short PVD link 153. The other end of the short PVD link 153 is rotatably connected to a bell crank 223 located on one end of the PVD idler shaft 155. The other end of the PVD idler shaft 155 is rotatably connected by a bell crank 225 to one end of the long PVD link 157. The other end of the long PVD 157 is rotatably connected to a bell crank 227 located at one end of the shaft 229 on which the pressure vent door (PVD) 83 is mounted. As a result, when the lock handle drive shaft 143 is rotated to rotate the lock pawl shaft 151, the lock pawl shaft 151 rotates the pressure vent door 83 closed against the force created by a torsional spring 231. See FIG. 15.

Figure 15:
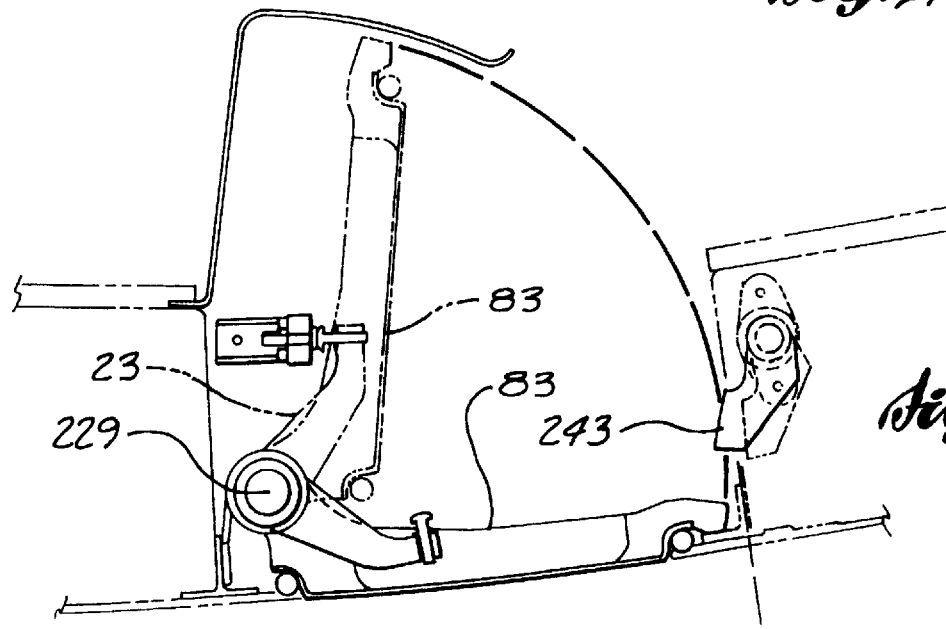
FIG. 15 is a cross-sectional view of a vent door suitable for use in an airplane cargo door formed in accordance with this invention.
Figure 13:
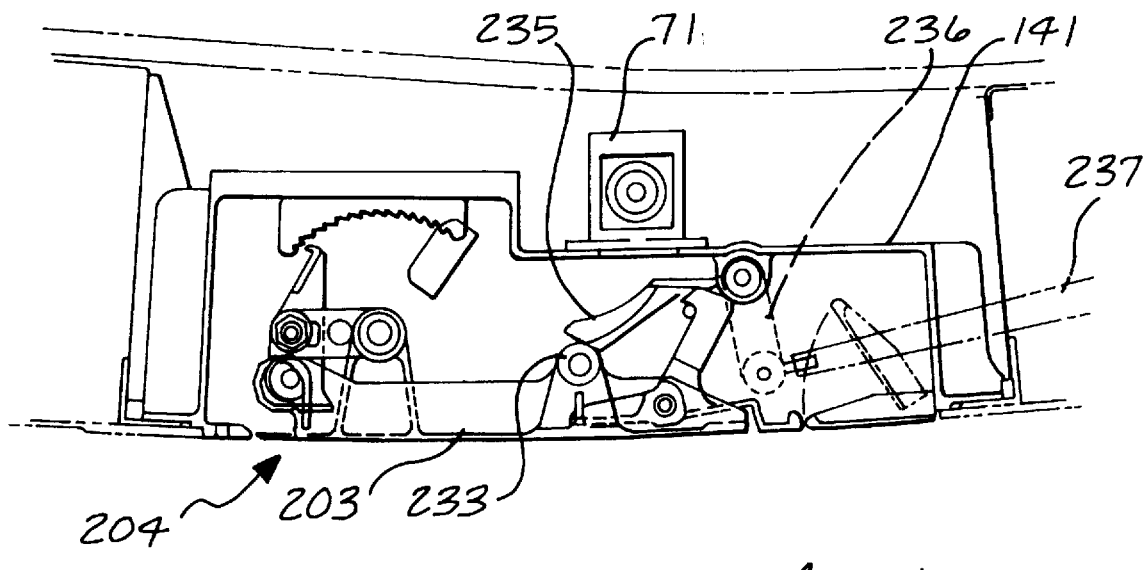
FIG. 13 is a further cross-sectional view of a lock handle housing and a lock handle formed in accordance with the invention, also taken orthogonal to the view shown in FIG. 11 showing additional components located in the lock handle housing.

In accordance with this invention, in order to prevent the PVD 83 from opening in the unlikely event of a water landing, an interlock connection is made between the lock handle 203 and the outer end of the PVD 83 that prevents the PVD 83 from opening. More specifically, as shown in FIGS. 13 and 14, the inner surface of the lock handle 203 supports a needle roller bearing 233. When the lock handle is closed, the needle roller bearing 233 impinges on one end of an interlock cam lever 235. The interlock cam lever 235 has a dogleg shape and is connected to the shaft 214 on which the sleeve 212 of the lock handle catch mechanism is mounted. Mounted on shaft 214, outside of the lock handle housing 144, is a bell crank 236. The bell crank 236 is connected to one end of a link 237. As shown in FIG. 9, the other end of the link 237 is rotatably connected to a bell crank 239 mounted on one end of a PVD interlock shaft 241. As shown in FIG. 15, mounted on the other end of the PVD interlock shaft 241 is a ditching interlock 243. The ditching interlock 243 is an arm that is rotated into an interlock position such that, when the lock handle is closed in the interlock position, the ditching interlock prevents the pressure vent door 83 from opening except for a very limited distance.

As will be appreciated from the foregoing description, the invention provides a latch lock mechanism ideally suited for use with airplane large cargo doors. The latch-lock mechanism improves on the latch-lock mechanism described in the '201 patent in a variety of ways. The use of straight latch drive shafts formed of a plurality of sections has a number of advantages described above. The inclusion of a lock pawl that is visible through witness ports allows a mechanic to be certain that the cargo door is fully latched and locked prior to take-off Access to the manual drive 90° gear box via the lock handle housing prevents inadvertent manual operation when the lock pawls are in place. The inclusion of a torsion fuse in the lock handle coupling prevents the application of excessive force to the lock pawls via the lock handle. Likewise, the inclusion of a torsion fuse in the manual drive train prevents the application of excess power using portable electric drive tools that could damage or destroy the clutch mechanism of the latch PDU. Other benefits and advantages of the present invention will be readily appreciated from the foregoing description.

While the presently preferred embodiment of the invention has been illustrated and described, it is to be understood that, within the scope of the appended claims, various changes can be made therein without departing from the spirit of the invention.

The embodiments of the invention in which an exclusive property or privilege is claimed are defined as follows:

1. In a latch-lock mechanism for a load carrying airplane cargo door that includes a plurality of latch cams located along the closing edge of the cargo door, a plurality of latch pins located along the closing edge of the cargo door's doorway in alignment with the latch cams, a power drive unit (PDU) mounted on the cargo door for rotating the latch cams between an unlatched position whereat said latch cams do not prevent said cargo door from opening and a latched position whereat said latch cams engage said latch pins and prevent said door from opening, first mechanical coupling for coupling the PDU to the latch cams, a plurality of lock elements associated with said plurality of latch cams and latch pins, a lock handle for moving said plurality of lock elements between a locked position and an unlocked position and second mechanical coupling for coupling the latch handle to the plurality of lock elements, the improvement comprising:

said first mechanical coupling including straight-through drive shafts mounted on said cargo door and extending outwardly from either side of said PDU to the sides of the cargo door, ending at the latch cams; and said lock elements comprising lock pawls positioned and constructed such that said lock pawls cannot be moved into a locked position unless said latch cams are in their latched position.

2. The improvement claimed in claim 1 including witness ports located in said airplane cargo door adjacent said lock pawls to allow a mechanic to determine if said latch cams are in their latched position and said lock pawls are in their locked position.

3. The improvement claimed in claim 2 wherein said latch-lock mechanism includes a lock handle housing mounted on said cargo door having an opening that is accessed from outside of said cargo door and wherein said lock handle is sized and positioned to close said opening, said lock handle being rotatably mounted on said lock handle housing so as to rotate outwardly to an open position when said lock handle moves said lock pawls to said unlock position.

4. The improvement claimed in claim 3 including a manual drive 90° gear box mounted on said lock handle housing so as to be accessible only when said lock handle is rotated outwardly to said open position, said first mechanical coupling coupling said manual drive 90° gear box to said PDU such that said manual drive 90° gear box can be used to rotate said straight-through drive shafts.

5. The improvement claimed in claim 4 including a torsional fuse in the portion of said mechanical coupling that couples said manual drive 90° gear box to said PDU.

6. The improvement claimed in claim 5 including a catch mechanism for latching said lock handle in a closed position such that a pull force is required to rotate said lock handle outwardly to said open position.

7. The improvement claimed in claim 6 wherein said latch pins are supported by a supporting structure and wherein said lock pawls are trapped between said latch cams and said latch pin supporting structure so as to prevent said latch pins from sliding sideways off said latch cams.

8. The improvement claimed in claim 7 wherein pairs of adjacent latch cams are located on the ends of stub shafts and wherein said stub shafts are mounted on the exterior of a central shaft.

9. The improvement claimed in claim 8 wherein said first mechanical coupling includes drive links for coupling said straight-through drive shafts to said latch cams and wherein said improvement includes a secondary over-travel stop positioned to limit the movement of said drive links.

10. The improvement claimed in claim 9 wherein said airplane cargo door includes a pressure vent door and wherein said improvement includes an interlock that prevents said pressure door from opening unless said lock handle is in said open position.

11. The improvement claimed in claim 2 including a catch mechanism for latching said lock handle in a closed position such that a pull force is required to rotate said lock handle outwardly to said open position.

12. The improvement claimed in claim 2 wherein said latch pins are supported by a supporting structure and wherein said lock pawls are trapped between said latch cams and said latch pin supporting structure so as to prevent said latch pins from sliding sideways off said latch cams.

13. The improvement claimed in claim 2 wherein pairs of adjacent latch cams are located on the ends of stub shafts and wherein said stub shafts are mounted on the exterior of a central shaft.

14. The improvement claimed in claim 2 wherein said first mechanical coupling includes drive links for coupling said straight-through drive shafts to said latch cams and wherein said improvement includes a secondary over-travel stop positioned to limit the movement of said drive links.

* * * * *